(12) United States Patent
Lai et al.

(10) Patent No.: US 11,109,056 B2
(45) Date of Patent: Aug. 31, 2021

(54) METHOD AND APPARATUS OF CURRENT PICTURE REFERENCING FOR VIDEO CODING USING ADAPTIVE MOTION VECTOR RESOLUTION AND SUB-BLOCK PREDICTION MODE

(71) Applicant: MEDIATEK INC., Hsinchu (TW)

(72) Inventors: Chen-Yen Lai, Hsinchu (TW); Zhi-Yi Lin, Hsinchu (TW); Ching-Yeh Chen, Hsinchu (TW); Tzu-Der Chuang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/968,295

(22) PCT Filed: Feb. 11, 2019

(86) PCT No.: PCT/CN2019/074783
§ 371 (c)(1),
(2) Date: Aug. 7, 2020

(87) PCT Pub. No.: WO2019/154417
PCT Pub. Date: Aug. 15, 2019

(65) Prior Publication Data
US 2020/0374545 A1 Nov. 26, 2020

Related U.S. Application Data

(60) Provisional application No. 62/747,170, filed on Oct. 18, 2018, provisional application No. 62/742,474, (Continued)

(51) Int. Cl.
*H04N 19/52* (2014.01)
*H04N 19/176* (2014.01)
(Continued)

(52) U.S. Cl.
CPC .......... *H04N 19/52* (2014.11); *H04N 19/176* (2014.11); *H04N 19/70* (2014.11); *H04N 19/96* (2014.11)

(58) Field of Classification Search
None
See application file for complete search history.

(56) References Cited

U.S. PATENT DOCUMENTS 6,993,079 B2   1/2006 Moon
9,516,313 B2  12/2016 Lim et al.
(Continued)

FOREIGN PATENT DOCUMENTS

CN    1491040 A    4/2004
CN  103688543 A    3/2014
(Continued)

OTHER PUBLICATIONS

International Search Report and Written Opinion dated May 6, 2019, issued in application No. PCT/CN2019/074783.
(Continued)

*Primary Examiner* — Christopher Braniff
(74) *Attorney, Agent, or Firm* — McClure, Qualey & Rodack, LLP

(57) ABSTRACT

Methods and apparatus for a video coding system with the current picture referencing (CPR) mode enabled are disclosed. According to one method, when the current reference picture is equal to the current picture, an integer motion vector flag is inferred to be true without signalling the integer or parsing the motion vector flag. In another method, when all motion vector differences for the current block are equal to zero, an integer motion vector flag is inferred to be true without signalling the integer or parsing the motion vector flag. In yet another method, when all reference pictures for the current block are equal to the current picture:
(Continued)

the sub-block prediction coding mode is disabled; and the current block is encoded or decoded by disabling the sub-block prediction coding mode. Alternatively, derived motion vectors associated with sub-blocks for the current block can be converted into integer motion vectors.

12 Claims, 7 Drawing Sheets

Related U.S. Application Data filed on Oct. 8, 2018, provisional application No. 62/629,204, filed on Feb. 12, 2018.

(51) Int. Cl.
*H04N 19/70* (2014.01)
*H04N 19/96* (2014.01)

(56) References Cited

U.S. PATENT DOCUMENTS

| | | |
|---|---|---|
| 2012/0287999 A1 | 11/2012 | Li et al. |
| 2016/0127731 A1* | 5/2016 | Guo ............... H04N 19/176 375/240.02 |
| 2016/0337662 A1 | 11/2016 | Pang et al. |

FOREIGN PATENT DOCUMENTS

| | | |
|---|---|---|
| CN | 104768015 A | 7/2015 |
| CN | 105493505 A | 4/2016 |
| WO | 2016/119104 A1 | 8/2016 |

OTHER PUBLICATIONS

Chinese language office action dated Dec. 6, 2019, issued in application No. TW 108104599.

* cited by examiner

M/2xM
Symmetric vertical splitting

M/2xM
Symmetric horizontal splitting

M/4xM (L)   M/4xM (R)   MxM/4 (U)   MxM/4 (D)

METHOD AND APPARATUS OF CURRENT PICTURE REFERENCING FOR VIDEO CODING USING ADAPTIVE MOTION VECTOR RESOLUTION AND SUB-BLOCK PREDICTION MODE

CROSS REFERENCE TO RELATED APPLICATIONS

The present invention claims priority to U.S. Provisional Patent Application, Ser. No. 62/629,204 filed on Feb. 12, 2018, U.S. Provisional Patent Application, Ser. No. 62/742,474 filed on Oct. 8, 2018 and U.S. Provisional Patent Application, Ser. No. 62/747,170 filed on Oct. 18, 2018. The U.S. Provisional Patent Applications are hereby incorporated by reference in their entireties.

FIELD OF THE INVENTION

The present invention relates to video coding using the current picture referencing (CPR) coding tool. In particular, the present invention discloses syntax signalling for a coding system using the CPR coding tool along with other coding tools such as adaptive motion vector resolution (AMVR), sub-block based temporal motion vector prediction (sbTMVP), or affine prediction.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a block is firstly partitioned by a quadtree structure and the quadtree splitting can be iterated until the size for a splitting block reaches the minimum allowed quadtree leaf node size. If the leaf quadtree block is not larger than the maximum allowed binary tree root node size, it can be further partitioned by a binary tree structure and the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

For block-based coding, there is always a need to partition an image into blocks (e.g. CUs, PUs and TUs) for the coding purpose. As known in the field, the image may be divided into smaller images areas, such as slices, tiles, CTU rows or CTUs before applying the block partition. The process to partition an image into blocks for the coding purpose is referred as partitioning the image using a coding unit (CU) structure. The particular partition method to generate CUs, PUs and TUs as adopted by HEVC is an example of the coding unit (CU) structure. The QTBT tree structure is another example of the coding unit (CU) structure.

Current Picture Referencing

Motion estimation/compensation is a well-known key technology in hybrid video coding, which explores the pixel correlation between adjacent pictures. In a video sequence, the object movement between neighbouring frames is small and the object movement can be modelled by two-dimensional translational motion. Accordingly, the patterns corresponding to objects or background in a frame are displaced to form corresponding objects in the subsequent frame or correlated with other patterns within the current frame. With the estimation of a displacement (e.g. using block matching techniques), the pattern can be mostly reproduced without the need to re-code the pattern. Similarly, block matching and copy has also been tried to allow selecting the reference block from within the same picture. It was observed to be not efficient when applying this concept to videos captured by a camera. Part of the reasons is that the textual pattern in a spatial neighbouring area may be similar to the current coding block, but usually with some gradual changes over space. It is thus difficult for a block to find an exact match within the same picture of video captured by a camera. Therefore, the improvement in coding performance is limited.

However, the spatial correlation among pixels within the same picture is different for screen content. For typical video with text and graphics, there are usually repetitive patterns within the same picture. Hence, Intra (picture) block compensation has been observed to be very effective. A new prediction mode, i.e., the Intra block copy (IBC) mode or called current picture referencing (CPR), has been introduced for screen content coding to utilize this characteristic. In the CPR mode, a prediction unit (PU) is predicted from a previously reconstructed block within the same picture. Further, a displacement vector (called block vector or BV) is used to signal the relative displacement from the position of the current block to the position of the reference block. The prediction errors are then coded using transformation, quantization and entropy coding. An example of CPR compensation is illustrated in FIG. 6, where area 610 corresponds to a picture, a slice or a picture area to be coded. Blocks 620 and 630 correspond to two blocks to be coded. In this example, each block can find a corresponding block in the previous coded area in the current picture (i.e., 622 and 632 respectively). According to this technique, the reference samples correspond to the reconstructed samples of the current decoded picture prior to in-loop filter operations including both deblocking and sample adaptive offset (SAO) filters in HEVC.

An early version of CPR was disclosed in JCTVC-M0350 (Madhukar Budagavi, et al, "AHG8: Video coding using Intra motion compensation", Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350), which is submitted as a candidate technology for HEVC Range Extensions (RExt) development. In t JCTVC-M0350, the CPR compensation was limited to be within a small local area and the search is limited to 1-D block vector for the block size of 2N×2N only. Later, a more advanced CPR method was developed during the standardization of HEVC SCC (screen content coding).

In order to signal the block vector (BV) efficiently, the BV is signalled predictively using a BV predictor (BVP) in a similar fashion as the MV coding. Accordingly, the BV difference (BVD) is signalled and the BV can be reconstructed according to BV=BVP+BVD as shown in FIG. 7, where reference block 720 is selected as IntraBC prediction for the current block 710 (i.e., a CU). A BVP is determined for the current CU. Methods to derive the motion vector predictor (MVP) is known in the field. Similar derivation can be applied to BVP derivation.

In JCTVC-N0256 (Pang, et al. in Non-RCE3: Intra Motion Compensation with 2-D MVs, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256), the 2-D Intra MC is further combined with the pipeline friendly approach:
1. No interpolation filters are used,
2. MV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D intra MC was adopted, the removal of interpolation filters was adopted, and the search area constraint to the current CTU and the left CTU was adopted. Other aspects were either turned down or suggested for further study.

In JCTVC-O0218 (Evaluation of Palette Mode Coding on HM-12.0+RExt-4.1, 15th Meeting: Geneva, CH, 23 Oct.-1 Nov. 2013, Document: JCTVC-O0218), spatial AMVP prediction is disclosed. FIG. 8 illustrates a number of possible block vector candidates in previously coded neighbouring block positions according to JCTVC-O0218. In Table 1, these positions are described in details:

TABLE 1

| Position | Description |
|---|---|
| 0 | below left position of the bottom left corner of the current block |
| 1 | left position of the bottom left corner of the current block |
| 2 | above right position of the top right corner of the current block |
| 3 | above position of the top right corner of the current block |
| 4 | above left position of the top left corner of the current block |

TABLE 1-continued

| Position | Description |
|---|---|
| 5 | left position of the top left corner of the current block |
| 6 | above position of the top left corner of the current block |

In HEVC, in addition to the spatial AMVP prediction, temporal MV predictor is also used for inter-slice motion compensation. As shown in FIG. 9, a temporal predictor is derived from a block ($T_{BR}$ or $T_{CTR}$) located in a co-located picture where the co-located picture is the first reference picture in reference list 0 or reference list 1. Since the block where a temporal MVP is located may have two MVs, one MV from reference list 0 and one MV from reference list 1, the temporal MVP is derived from the MV from reference list 0 or reference list 1 according to the following rule:
1. The MV that crosses the current picture is chosen first.
2. If both MVs cross the current picture or both do not cross, the one with same reference list as the current list will be chosen.

When CPR is used, only part of the current picture can be used as the reference picture. Some bitstream conformance constraints are imposed to regulate the valid MV value referring to the current picture.

First, one of the following two equations must be true:

$$BV\_x+\text{offset}X+n\text{PbSw}+x\text{Pbs}-x\text{Cbs}<=0, \text{ and} \qquad (1)$$

$$BV\_y+\text{offset}Y+n\text{PbSh}+y\text{Pbs}-y\text{Cbs}<=0. \qquad (2)$$

Second, the following WPP (Wavefront Parallel Processing) condition must be true:

$$(x\text{Pbs}+BV\_x+\text{offset}X+n\text{PbSw}-1)/\text{CtbSize}Y-x\text{Cbs}/\text{CtbSize}Y<=$$

$$y\text{Cbs}/\text{CtbSize}Y-(y\text{Pbs}+BV\_y+\text{offset}Y+n\text{PbSh}-1)/\text{Ctb-Size}Y \qquad (3)$$

In equations (1) through (3), (BV_x, BV_y) is the luma block vector (i.e., the motion vector for CPR) for the current PU; nPbSw and nPbSh are the width and height of the current PU; (xPbS, yPbs) is the location of the top-left pixel of the current PU relative to the current picture; (xCbs, yCbs) is the location of the top-left pixel of the current CU relative to the current picture; and CtbSizeY is the size of the CTU. OffsetX and offsetY are two adjusted offsets in two dimensions in consideration of chroma sample interpolation for the CPR mode:

$$\text{offset}X=BVC\_x \text{ \& } 0x7 \text{ ? } 2: 0, \qquad (4)$$

$$\text{offset}Y=BVC\_y \text{ \& } 0x7 \text{ ? } 2: 0. \qquad (5)$$

(BVC_x, BVC_y) is the chroma block vector, in 1/8-pel resolution in HEVC.

Third, the reference block for CPR must be within the same tile/slice boundary.

Affine Motion Compensation

The affine model can be used to describe 2D block rotations, as well as 2D deformations of squares (rectangles) into parallelogram. This model can be described as follows:

$$x'=a0+a1*x+a2*y,$$

$$y'=b0+b1*x+b2*y. \qquad (6)$$

In this model, 6 parameters need to be determined. For each pixels (x, y) in the area of interest, the motion vector is determined as the difference between location of the given pixel (A) and he location of its corresponding pixel in the reference block (A'), i.e., MV=A'−A=(a0+(a1−1)*x+a2*y, b0+b1*x+(b2−1)*y). Therefore, the motion vector for each pixel is location dependent.

According to this model, if the motion vectors of three different locations are known, then the above parameters can be solved. It is equivalent to the condition that the 6 parameters are known. Each location with a known motion vector is referred as a control point. The 6-parameter affine model corresponds to a 3-control-point model.

In the technical literature by Li, et al. ("An affine motion compensation framework for high efficiency video coding", in 2015 IEEE International Symposium on Circuits and Systems (ISCAS), 24-27 May 2015, Pages: 525-528) and by Huang et al. ("Control-Point Representation and Differential Coding Affine-Motion Compensation", IEEE Transactions on Circuits, System and Video Technology (CSVT), Vol. 23, No. 10, pages 1651-1660, October 2013), some exemplary implementations of affine motion compensation are presented. In the technical literature by Li, et al., an affine flag is signalled for the 2N×2N block partition, when current block is coded in either Merge mode or AMVP mode. If this flag is true, the derivation of motion vectors for the current block follows the affine model. If this flag is false, the derivation of motion vectors for the current block follows the traditional translational model. Three control points (3 MVs) are signalled when affine AMVP mode is used. At each control point location, the MV is predictively coded. Later, the MVDs of these control points are coded and transmitted. In the technical literature by Huang et al., different control point locations and predictive coding of MVs in control points are studied.

A syntax table for an affine motion compensation implementation is shown in Table 2. As shown in Table 2, syntax element use_affine_flag is signalled if at least one Merge candidate is affine coded and the partition mode is 2N×2N (i.e., PartMode==PART 2N×2N) as indicated by Notes (2-1) to (2-3) for the Merge mode. Syntax element use_affine_flag is signalled if the current block size is larger than 8×8 (i.e., (log2CbSize>3) and the partition mode is 2N×2N (i.e., PartMode==PART 2N×2N) as indicated by Notes (2-4) to (2-6) for the B slice. If use_affine_flag indicates the affine model being used (i.e., use_affine_flag having a value of 1), information of other two control points is signalled for reference list L0 as indicated by Notes (2-7) to (2-9) and information of other two control points is signalled for reference list L1 as indicated by Notes (2-10) to (2-12).

TABLE 2

| | Note |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | |
|   } else { /* MODE_INTER */ | |
|     merge_flag[ x0 ][ y0 ] | |
|     if( merge_flag[ x0 ][ y0 ] ) { | |
|       if( at least one merge candidate is affine coded && PartMode == PART_2Nx2N) | 2-1 |
|         use_affine_flag | 2-2 |
|       else | 2-3 |
|       if( MaxNumMergeCand > 1 ) | |
|         merge_idx[ x0 ][ y0 ] | |
|     } else { | |
|       if( slice_type == B ) | |
|         inter_pred_idc [ x0 ][ y0 ] | |
|       if( log2CbSize > 3 && PartMode == PART_2Nx2N) | 2-4 |
|         use_affine_flag | 2-5 |
|       if( inter_pred_idc[ x0 ][ y0 ] != PRED_L1 ) { | 2-6 |
|         if( num_ref_idx_l0_active_minus1 > 0) | |
|           ref_idx_l0[ x0 ][ y0 ] | |
|         mvd_coding( x0, y0, 0 ) | |
|         if( use_affine_flag){ | 2-7 |
|           mvd_coding( x0, y0, 0 ) /* second control point when affine mode is used */ | 2-8 |
|           mvd_coding( x0, y0, 0 ) /* third control point when affine mode is used */ | 2-9 |
|         } | |
|         mvp_l0_flag[ x0 ][ y0 ] | |
|       } | |
|       if( inter_pred_idc[ x0 ][ y0 ] != PRED_L0 ) { | |
|         if( num_ref_idx_l1_active_minus1 > 0) | |
|           ref_idx_l1[ x0 ][ y0 ] | |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         if( use_affine_flag){ | 2-10 |
|           mvd_coding( x0, y0, 1 ) /* second control point when affine mode is used */ | 2-11 |
|           mvd_coding( x0, y0, 1 ) /* third control point when affine mode is used */ | 2-12 |
|         } | |
|         mvp_l1_flag[ x0 ][ y0 ] | |
|       } | |
|     } | |
|   } | |
| } | |

Palette coding. In screen content coding, palette is utilized to represent a given video block (e.g. CU). The encoding process is as disclosed by Guo et al., in JCTVC-O0218 (Evaluation of Palette Mode Coding on HM-12.0+RExt-4.1, 15th Meeting: Geneva, CH, 23 Oct.-1 Nov. 2013, Document: JCTVC-O0218) as follows:
1. Transmission of the palette: the palette size is first transmitted followed by the palette elements.
2. Transmission of pixel values: the pixels in the CU are encoded in a raster scan order. For each position, a flag is first transmitted to indicate whether the "run mode" or "copy above mode" is being used.
   2.1 "Run mode": In "run mode", a palette index is first signalled followed by "palette_run" (e.g., M). No further information needs to be transmitted for the current position and the following M positions as they have the same palette index as signalled. The palette index (e.g., i) is shared by all three colour components, which means that the reconstructed pixel values are (Y, U, V)=(palette$_Y$[i], palette$_U$[i], palette$_V$[i]) (assuming the colour space is YUV)
   2.2 "Copy above mode": In "copy above mode", a value "copy_run" (e.g., N) is transmitted to indicate that for the following N positions (including the current one), the palette index is equal to the palette index of the one that is at the same location in the row above.
3. Transmission of residue: the palette indices transmitted in Stage 2 are converted back to pixel values and used as the prediction. Residue information is transmitted using HEVC residue coding and is added to the prediction for the reconstruction.

In JCTVC-N0247 (Guo, et al., RCE3: Results of Test 3.1 on Palette Mode for Screen Content Coding, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0247), palette of each component are constructed and transmitted. The palette can be predicted (shared) from its left neighbouring CU to reduce the bitrate. Later on Qualcomm proposed a second version of their palette coding technique [1], in which each element in the palette is a triplet, representing a specific combination of the three colour components. The predictive coding of palette across CU is removed. This invention proposes the usage of palette prediction/sharing that can also be applied to the triplet palette format. Again both the palette from the left and/or above CU are utilized, as long as the above CU is within the same CTB (LCU) as the current CU being encoded (reducing line buffer).

Major-Colour-Based (or Palette) Coding.

Palette coding is another tool for screen content coding, where palette of each colour component is constructed and transmitted. However, the palette can be predicted from the palette of the left CU. For palette prediction, individual entries in a palette can be predicted from the corresponding palette entries in the above CU or left CU.

Upon the construction of the palette, pixel values in a current block are mapped into colour indices according to the palette and the colour indices are then coded using a predictive coding method as described in JCTVC-O0182 (Guo et al., AHG8: Major-color-based screen content coding, Joint Collaborative Team on Video Coding (JCT-VC) of ITU-T SG 16 WP 3 and ISO/15th Meeting: Geneva, CH, 23 Oct.-1 Nov. 2013, Document: JCTVC-O0182). According to JCTVC-O0182, a pixel line can be predicted by different modes. In specific, three kinds of line modes, i.e. horizontal mode, vertical mode and normal mode are used for a pixel line. In horizontal mode, all the pixels in the same line have the same value. If the value is the same as the first pixel of the above pixel line, only line mode signalling bits are transmitted. Otherwise, the index value is also transmitted. In vertical mode, the current pixel line is the same with the above pixel line. Therefore, only line mode signalling bits are transmitted. In normal mode, pixels in a line are predicted individually. For each pixel, the left or above neighbours is used as predictor, and the prediction symbol is transmitted to the decoder.

Furthermore, pixels are classified into major colour pixels and escape pixel according to JCTVC-O0182. For major colour pixels, the decoder reconstructs pixel value by the major colour index (i.e., palette index) and the palette. For escape pixel, the encoder has to further send the pixel value.

In the present invention, various aspects of CPR coding with the QTBT structure or luma/chroma separate coding are addressed.

BRIEF SUMMARY OF THE INVENTION

A method and apparatus of syntax signalling for a video encoding system and video decoding system are disclosed, where current picture referencing (CPR) and adaptive motion vector resolution (AMVR) coding tools are enabled. According to this method, a current reference picture for a current block in a current image is determined first. When the current reference picture is equal to the current picture, an integer motion vector flag is inferred to be true without signalling the integer motion vector flag in a bitstream at an encoder side or parsing the integer motion vector flag from the bitstream at a decoder side for the current block. The integer motion vector flag being true indicates a current motion vector (MV) being represented in one integer number and the integer motion vector flag being false indicates the current motion vector (MV) being represented in one fractional number.

According to the above method, when the integer motion vector flag is true, an additional indication can be further signalled in the bitstream at the encoder side or parsed from the bitstream at the decoder side for the current block. The additional indication indicates whether an integer mode or a 4-pel mode is used. In one embodiment, the integer motion vector flag can be referred to be true regardless of a motion vector difference (MVD) between the current MV and an MV predictor. In another embodiment, when the current reference picture is not equal to the current picture, the integer motion vector flag is inferred to be false without signalling the integer motion vector flag in the bitstream at the encoder side or parsing the integer motion vector flag from the bitstream at the decoder side for the current block.

According to a second method, motion vector differences for a current block in a current image are determined. When all motion vector differences for the current block are equal to zero, an integer motion vector flag is inferred to be false without signalling the integer motion vector flag in a bitstream at an encoder side or parsing the integer motion vector flag from the bitstream at a decoder side for the current block. The integer motion vector flag being true indicates a current motion vector (MV) being represented in one integer number and the integer motion vector flag being false indicates the current motion vector (MV) being represented in one fractional number.

For the second method, the integer motion vector flag may be referred to be false when all motion vector differences for the current block are equal to zero regardless of whether a selected reference picture associated with the current MV is equal to the current picture or not. In another embodiment, the integer motion vector flag is referred to be true if any motion vector difference for the current block is not equal to zero and the selected reference picture associated with the current MV is equal to the current picture. In yet another embodiment, the integer motion vector flag is signalled in the bitstream at the encoder side or parsed from the bitstream at the decoder side for the current block if any motion vector difference for the current block is not equal to zero and the selected reference picture associated with the current MV is not equal to the current picture. In still yet another embodiment, the integer motion vector flag is referred to be false only when a selected reference picture associated with the current MV is not equal to the current picture.

According to a third method, syntax signalling by a video encoding system and video decoding system is disclosed, where current picture referencing (CPR) coding tool and sub-block prediction coding mode are enabled. All reference pictures for a current block in a current image are determined. When all reference pictures for the current block are equal to the current picture: the sub-block prediction coding mode is disabled; and the current block is encoded at an encoder side or decoded at a decoder side by disabling the sub-block prediction coding mode.

According to the third method, a syntax element indicating the sub-block prediction coding mode is not signalled in a bitstream at the encoder side or not parsed from the bitstream at the decoder side for the current block when all reference pictures for the current block are equal to the current picture. In another embodiment, a syntax element indicating the sub-block prediction coding mode is inferred to be false when all reference pictures for the current block are equal to the current picture. In yet another embodiment, a syntax element indicating the sub-block prediction coding mode is constrained to indicate the sub-block prediction coding mode being disabled when all reference pictures for the current block are equal to the current picture. The sub-block prediction coding mode may be associated with affine prediction coding tool or sbTMVP (Subblock based temporal motion vector prediction) coding tool.

According to a fourth method, syntax signalling by a video encoding system and video decoding system is disclosed, where current picture referencing (CPR) coding tool and sub-block prediction coding mode are enabled. All reference pictures for a current block in a current image are determined. When all reference pictures for the current block are equal to the current picture: derived motion vectors associated with sub-blocks for the current block are converted into integer motion vectors; and a current motion vector of the current block is encoded at an encoder side or decoded at a decoder side using the integer motion vectors as motion vector predictors.

DETAILED DESCRIPTION OF THE INVENTION

Figure 1:
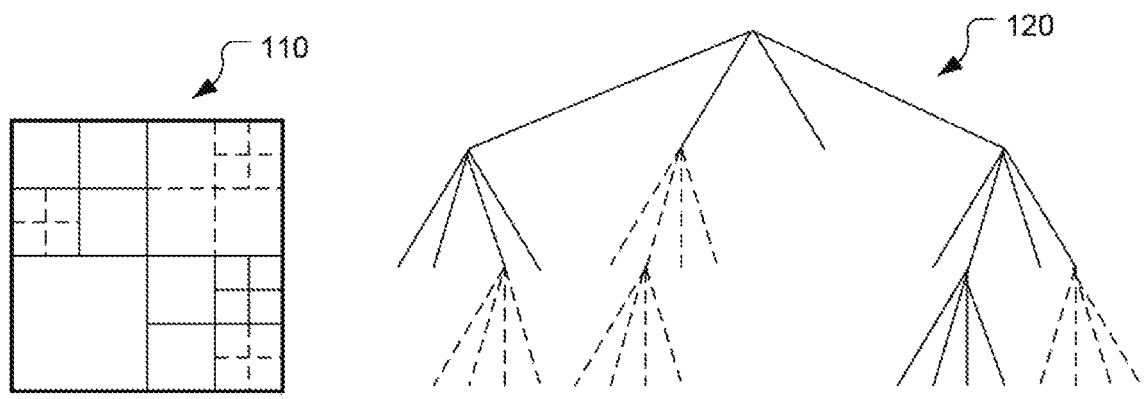
FIG. 1 illustrates an example of block partition using quadtree structure to partition a coding tree unit (CTU) into coding units (CUs).
Figure 2:
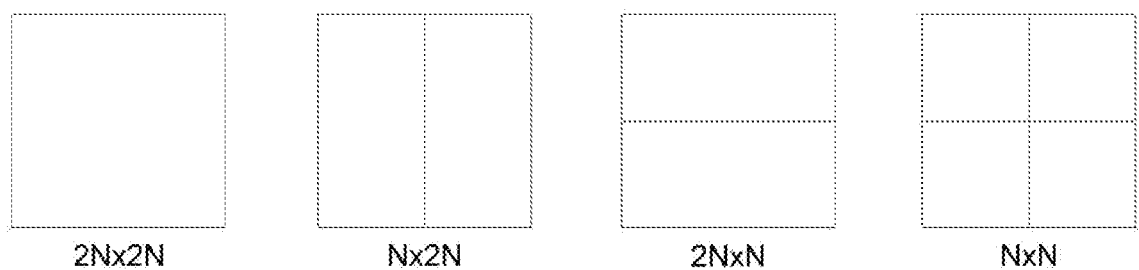
FIG. 2 illustrates asymmetric motion partition (AMP) according to High Efficiency Video Coding (HEVC), where the AMP defines eight shapes for splitting a CU into PU.
Figure 2:
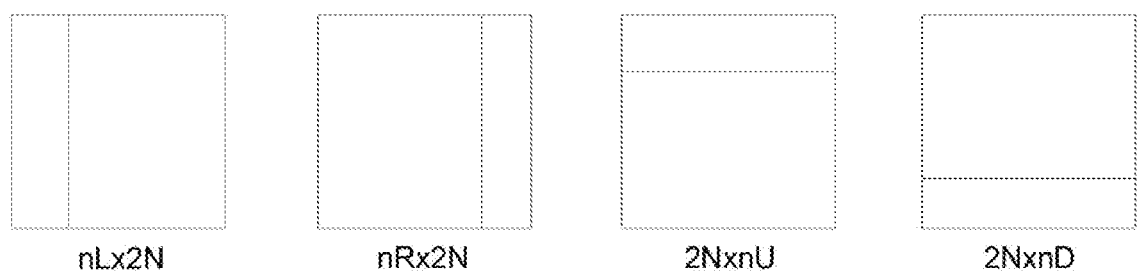
Figure 3:
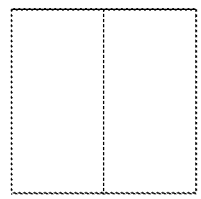
FIG. 3 illustrates an example of various binary splitting types used by a binary tree partitioning structure, where a block can be recursively split into two smaller blocks using the splitting types.
Figure 3:
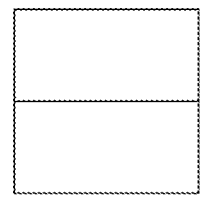
Figure 3:
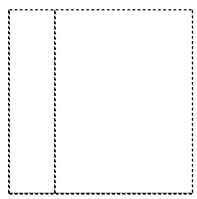
Figure 3:
Figure 3:
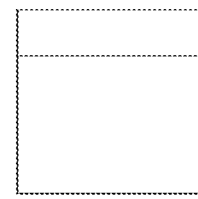
Figure 3:
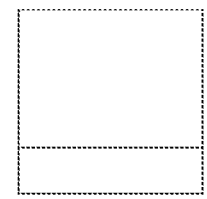
Figure 4:
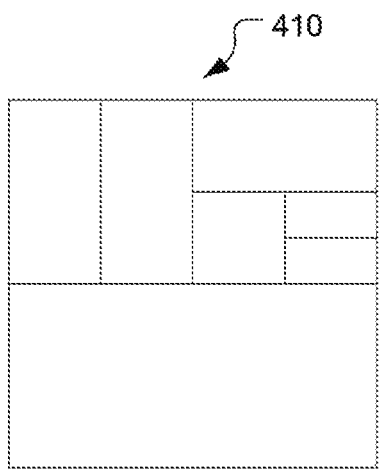
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 4:
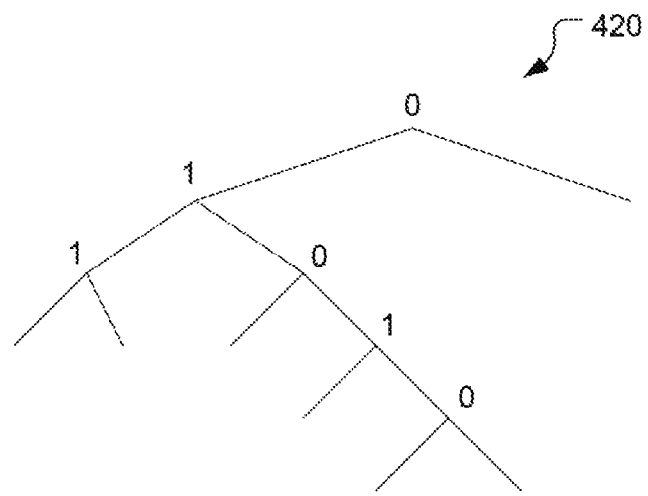
Figure 5:
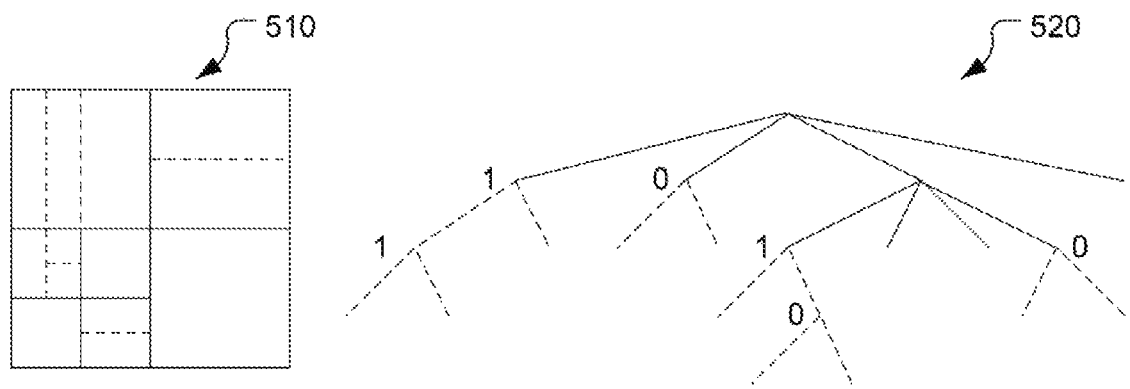
FIG. 5 illustrates an example of block partitioning and its corresponding quad-tree plus binary tree structure (QTBT), where the solid lines indicate quadtree splitting and dotted lines indicate binary tree splitting.
Figure 6:
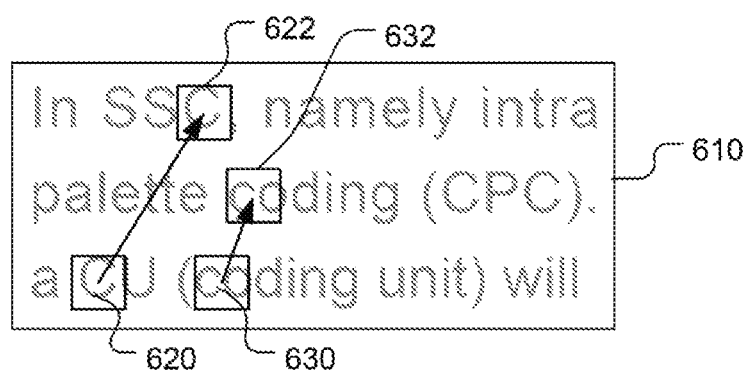
FIG. 6 illustrates an example of CPR compensation, where area 610 corresponds to a picture, a slice or a picture area to be coded. Blocks 620 and 630 correspond to two blocks to be coded.
Figure 7:
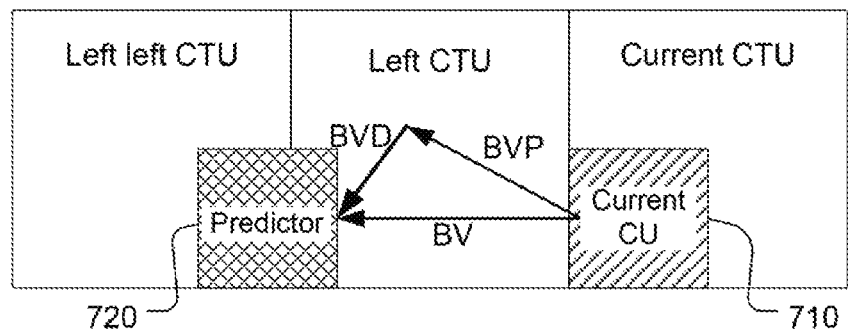
FIG. 7 illustrates an example of predictive block vector (BV) coding, where the BV difference (BVD) corresponding to the difference between a current BV and a BV predictor is signalled.
Figures 8, 9:
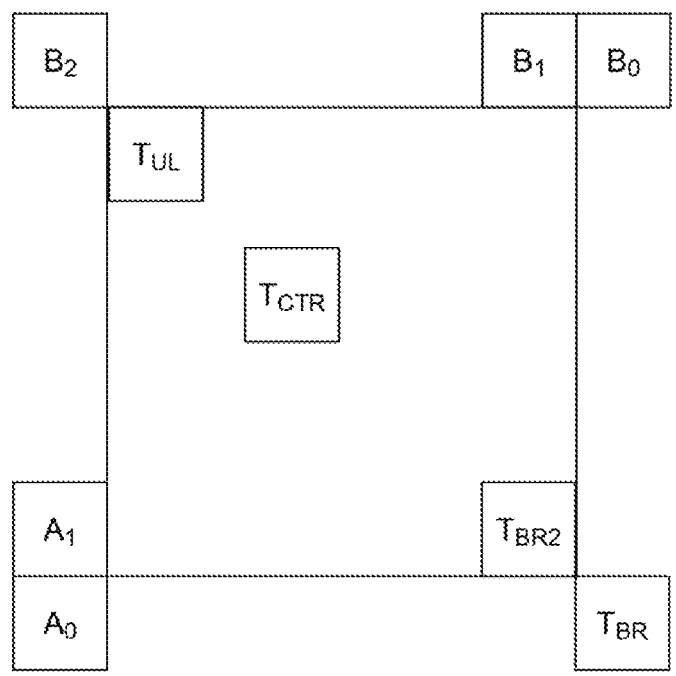
FIG. 8 illustrates a number of possible block vector candidates in previously coded neighbouring block positions spatial advanced motion vector prediction (AMVP).
FIG. 9 illustrates a temporal predictor derived from a block ($T_{BR}$ or $T_{CTR}$) located in a co-located picture, where the co-located picture is the first reference picture in reference list 0 or reference list 1.

The following description is of the best-contemplated mode of carrying out the invention. This description is made for the purpose of illustrating the general principles of the invention and should not be taken in a limiting sense. The scope of the invention is best determined by reference to the appended claims.

In the video coding based on original quad-tree plus binary tree (QTBT) structure and the luma/chroma separate coding, the luma and chroma are coded separately for all Intra frames (for example, I-slice). In the following, various aspects of using the CPR coding tool for luma/chroma separate coding as well as syntax signalling are disclosed.

CPR with Affine Motion Compensation

If the affine motion compensation is enable and the affine flag is signalled before the reference picture index, the reference picture index (Ref-idx) for List 0 or List 1 or both List 0 and List 1 will need to be signalled at an encoder side or parsed at a decoder side. However, according to an embodiment of the present invention, the current picture can be removed from the reference picture list since the current picture will not be in the reference picture list when the affine mode is selected. Therefore, the length of the codeword for the reference picture index can be reduced and the coding efficiency will be improved.

CPR with Adaptive Motion Resolution

In a video coding system supporting adaptive motion vector resolution (AMVR), the motion vector (MV) or its derivatives (i.e., motion vector difference (MVD) or motion vector predictor (MVP)) can be represented in various resolutions (i.e., integer and fractional numbers). A flag (i.e., imv-flag) is used to indicate the selection. The integer MV flag (imv-flag) being true indicates that the integer MV is used. In this case, either integer MV mode or 4-pel mode can be used. An additional bit is used to signal the integer mode or the 4-pel mode being selected. If the integer MV flag (imv-flag) is true, the MVP needs to be rounded to an integer.

Furthermore, there are 3 different types of AMVR signalling being disclosed. In the first-type AMVR signalling, imv-flag and Imv mode are signalled, where the Imv-flag signalling doesn't depend on the MVD. An example of syntax design according to the type-1 AMVR signalling is show as follows:

Ref-idx, MVP, MVD
imv-flag
if(imv-flag)
    imv mode

In the above example, bold character is used to represent a syntax coding. In the above example, when MVD=0, imv-flag is still signalled. In this case, MV can be either the original MVP (i.e., imv-flag being false) or the rounded-MVP (i.e., imv-flag being true).

In the second-type AMVR signalling, imv-flag, Imv mode and MVD are signalled, where imv-flag signalling depends on the MVD. An example of syntax design according to the type-2 AMVR signalling is show as follows:

Ref-idx, MVP, MVD
if(MVD !=0)
    imv-flag
else
    imv-flag=false
if(imv-flag)
    imv mode In the above case, when MVD=0, imv-flag inferred as 0 and MV can only be MVP.

In the third-type AMVR signalling, IMV flag, Imv mode and MVD are signalled. An example of syntax design according to the type-3 AMVR signalling is show as follows:

imv-flag
if(imv-flag)
    imv mode
Ref-idx, MVP, MVD

In the above case, ref-idx, MVP and MVD are coded after imv-flag.

In the conventional syntax design, there may be some redundancy. In order to improve coding efficiency, various syntax designs related to CPR and AMVR are disclosed. In one embodiment, if adaptive motion resolution (AMVR) for List 0 or List 1 or both List 0 and List 1 is enabled and AMVR is signalled before the reference picture index, the reference picture index needs to be signalled or parsed for List 0 or List 1 or both List 0 and List 1.

If the reference picture index for List 0 or List 1 or both List 0 and List 1 is signalled before the integer MV flag (imv-flag) and the reference picture for List 0 or List 1 or both List 0 and List 1 is equal to the current picture, the integer MV flag imv-flag is inferred as true according to an embodiment of the present invention. Therefore, the integer MV flag imv-flag needs not to be signalled or parsed for List 0 or List 1 or both List 0 and List 1.

When the 4-pel integer MV mode is adopted as one of the integer MV modes, an integer MV index (imv_idx) can be signalled according to one embodiment of the present invention. When imv_idx is 0, the fractional MV (e.g. quarter MV) is used; when the imv_idx is 1, the integer MV is used; and when the imv_idx is 2, the 4-pel MV is used.

The above embodiment can be implemented by modifying the existing signalling design. For example, the type-1 syntax design can be modified as follows:

Ref-idx, MVP, MVD
if (ref != CPR)
{
    imv-flag
}
else
{
    imv-flag = true
}
if(imv-flag)
    imv mode In the above example, the syntax imv-flag is signalled when the reference picture is not equal to the current picture (i.e., "if (ref !=CPR)"). Otherwise (i.e., the "else" case), the imv-flag is inferred as true (i.e., "imv-flag=true"). The above embodiment can be implemented by modifying the type-2 syntax design can be modified as follows:

Ref-idx, MVP, MVD
if (ref != CPR)
{
    if (MVD != 0)
        imv-flag
    else
        imv-flag = false
}
else
{
    imv-flag = true
}
if(imv-flag)
    imv mode In the above example, when the reference picture is not equal to the current picture (i.e., "if (ref !=CPR)"), if MVD is not equal to zero (i.e., "if (MVD !=0)"), the syntax imv-flag is signalled; otherwise (i.e., the "else" case), the imv-flag is inferred as false (i.e., "imv-flag=true"). When the reference picture is equal to the current picture (i.e., the "else" case for "if (ref !=CPR)"), the imv-flag is inferred as true (i.e., "imv-flag=true").

f the reference picture index for List 0 or List 1 or both List 0 and List 1 is signalled before the integer MV flag and the reference picture for List 0 or List 1 or both List 0 and List 1 is equal to the current picture, the imv_idx can only be greater than 0, such as 1 or 2. In one example, one bin is signalled to indicate whether the imv_idx is equal to 1 or 2.

In the above examples, the syntax of "imv-flag" and "imv-mode" are combined as the new syntax "imv_idx". When the imv_idx is 0, the fractional MV (e.g. quarter MV) is used; when the imv_idx is 1, the integer MV is used; when the imv_idx is 2, the 4-pel MV is used.

In the above example, if the imv-flag is inferred as true, it means the imv_idx shall be 1 or 2; if imv-flag is false, the imv_idx is 0.

In one embodiment, the imv_idx can be binarized by using truncated binary code, such as 1-bit code "0" for imv_idx=0, 2-bit code "10" for imv_idx=1, and 2-bit code "11" for imv_idx=2. The imv-flag can be the treated as the first bin of the imv_idx and the imv-mode can be treated as the second bin of the imv_idx. The above "imv-flag" and "imv-mode" syntax signaling can be converted to "imv_idx" syntax signalling. For example, the following pseudo code can be used to implement the embodiment:

```
if (ref != CPR)
{
   imv-flag
}
else
{
   imv-flag = true
}
if(imv-flag)
   imv mode
```

When the ref is equal to CPR, the imv_idx shall be 1 or 2 (i.e., the first bin of imv_idx being inferred as 1 since the imv-flag being inferred as 1). In another example, if imv-flag is inferred as 0, the imv_idx is inferred as 0.

In other embodiments, if the reference picture index is signalled before the integer MV flag, the reference picture is equal to the current picture and the MVD in List 0 or List 1 or both List 0 and List 1 is equal to zero, then the integer MV flag in List 0 or List 1 or both List 0 and List 1 is inferred as false. Accordingly, the integer MV flag needs not to be signalled at an encoder side or parsed at a decoder side either. In other words, if the integer MV flag is false in List 0 or List 1 or both List 0 and List 1 and the reference picture in List 0 or List 1 or both List 0 and List 1 is equal to the current picture, it implies that the MVD for the target reference picture is equal to zero. In this disclosure, a phrase "a syntax element is signalled or parsed" may be used for convenience. It is understood that it corresponds to an abbreviation of "a syntax element is signalled at an encoder side or parsed at a decoder side".

The above embodiment can be implemented by modifying the type-2 syntax design as follows:

```
Ref-idx, MVP, MVD
if (MVD != 0 )
{
   if (ref != CPR)
   {
      imv-flag
   }
   Else
   {
      imv-flag = true
   }
}
else
   imv-flag = false
if(imv-flag)
   imv mode
```

In another embodiment, the integer MV flag is inferred as false only when MVDs are zero in List 0, List 1, or both List 0 and List 1 and the selected reference picture is not equal to the current picture. This embodiment can be implemented by modifying the type-2 syntax design as follows:

```
Ref-idx, MVP, MVD
if (MVD != 0 )
   imv-flag
else
{
   if (ref != CPR)
      imv-flag = false
   else
      imv-flag = true
}
if(imv-flag)
   imv mode
```

Another exemplary signalling design for this embodiment is shown as follows:

```
Ref-idx, MVP, MVD
if (MVD != 0 )
{
   if (ref != CPR)
      imv-flag
}
else
{
   if (ref != CPR)
      imv-flag = false
   else
      imv-flag = true
}
if(imv-flag)
   imv mode
```

In yet another embodiment, the integer MV flag is inferred as true when the selected reference picture is equal to the current picture, regardless of MVDs. This embodiment can be implemented by modifying the type-2 syntax design can be modified as follows:

```
Ref-idx, MVP, MVD
if (ref == CPR)
{
   imv-flag = true
}
else
{
   if (MVD != 0)
      imv-flag
   else
      imv-flag = false
}
if(imv-flag)
   imv mode
```

CPR with Adaptive Motion Resolution and Affine Motion Compensation

If the affine flag for List 0 or List 1 or both List 0 and List 1 is signalled at an encoder side or parsed at a decoder side before integer MV flag and the reference picture index, both the integer MV flag and the reference picture index will need to be signalled or parsed for List 0 or List 1 or both List 0 and List 1. However, the current picture can be removed from the reference picture list if the affine mode is used (e.g. affine flag equal to 1). Therefore, the length of the codeword for the reference picture index can be reduced.

If the integer MV flag is signalled or parsed before the affine flag and the reference picture index, both the affine flag and the reference picture index will need to be signalled or parsed. Similarly, the current picture can be removed from the reference picture list if the fractional MV mode is used (e.g. the integer MV being disabled), Therefore, the length of the codeword for the reference picture index can be reduced.

If the reference picture index for List 0 or List 1 or both List 0 and List 1 is signalled or parsed before the affine flag and/or the integer MV flag, if the reference picture is equal to the current frame, then the affine flag is inferred as false. Therefore, the affine flag needs not to be signalled or parse for List 0 or List 1 or both List 0 and List 1. Likewise, the integer MV flag for List 0 or List 1 or both List 0 and List 1 is inferred as true (or the imv_idx equal to 1 or 2) according to an embodiment of the present invention. However, in other embodiments, under the above conditions, if the MVD for List 0 or List 1 or both List 0 and List 1 is equal to zero, then the integer MV flag is inferred as false.

CPR with Sub-Block Mode

The sub-block mode (e.g. sbTMVP (Subblock based temporal motion vector prediction) (or also called as Alternative Temporal Motion Vector Prediction (ATMVP) or sub-block temporal merge mode/candidate), or affine prediction) can be used to improve the coding efficiency. For these kinds of sub-block mode, they can be collected to share as a candidate list, called sub-block mode candidate list. In skip mode coding, merge mode coding, or AMVP mode coding (i.e., Inter mode coding), a flag can be signalled to indicate whether the sub-block mode is used or not. If the sub-block mode is used, a candidate index is signalled or inferred to select one of the sub-block candidates. The sub-block candidate can include the sub-block temporal merge candidate, affine candidate, and/or planar MV mode candidate. In one embodiment, if the CPR mode is used or selected (which may be indicated implicitly or be indicated explicitly using a flag or any other syntax element) and there is no other Inter reference pictures (e.g. all the reference pictures being the current picture, which implies that the current picture is the only reference picture for the current block), the sub-block mode is disabled. In some embodiments, if a flag indicating the CPR mode is selected, it is inferred that the current picture is the only reference picture for the current block. In the syntax design, the sub-block mode syntax is not signalled (e.g. sub-block mode flag inferred as false), or the sub-block mode syntax is constrained to disable the sub-block mode (e.g. sub-block mode flag constrained to be false as a bitstream conformance requirement with the sub-block mode flag being false). The sub-block mode constraint is applied in the skip mode and the merge mode. In another embodiment, when the sub-block mode is used in CPR (e.g. the CPR mode used and no other inter reference pictures, or the selected reference picture being the current picture), the derived motion vector of each sub-block is also rounded to be integer MVs. The foregoing proposed methods can be implemented in the encoders and/or decoders. For example, the proposed methods can be implemented in an Inter prediction module of an encoder, and/or an Inter prediction module of a decoder.

New Condition to Allow Dual Tree Coding with intraBC Mode

In HEVC SCC extension, if an I slice with intraBC mode is enabled, this I slice will be coded as an Inter slice. An on-off flag for the intraBC mode can be indicated by checking a reference frame list. If a current frame is inserted into a reference frame list, the intraBC mode is enabled.

Furthermore, in BMS2.1 reference software, a dual tree is enabled for I slice which applies separate coding unit partitioning to Luma and Chroma signals. In order to make better integration of intraBC mode and dual tree coding, dual tree coding in an Inter slice (e.g. P-slice or B-slice) is allowed if only one reference frame is placed into a reference list and this reference frame is the current frame.

In this disclosure, the CPR, affine prediction, AMVR, ATMVP, intraBC are techniques used for video coding. These techniques are also referred as coding tools in this disclosure.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 10:
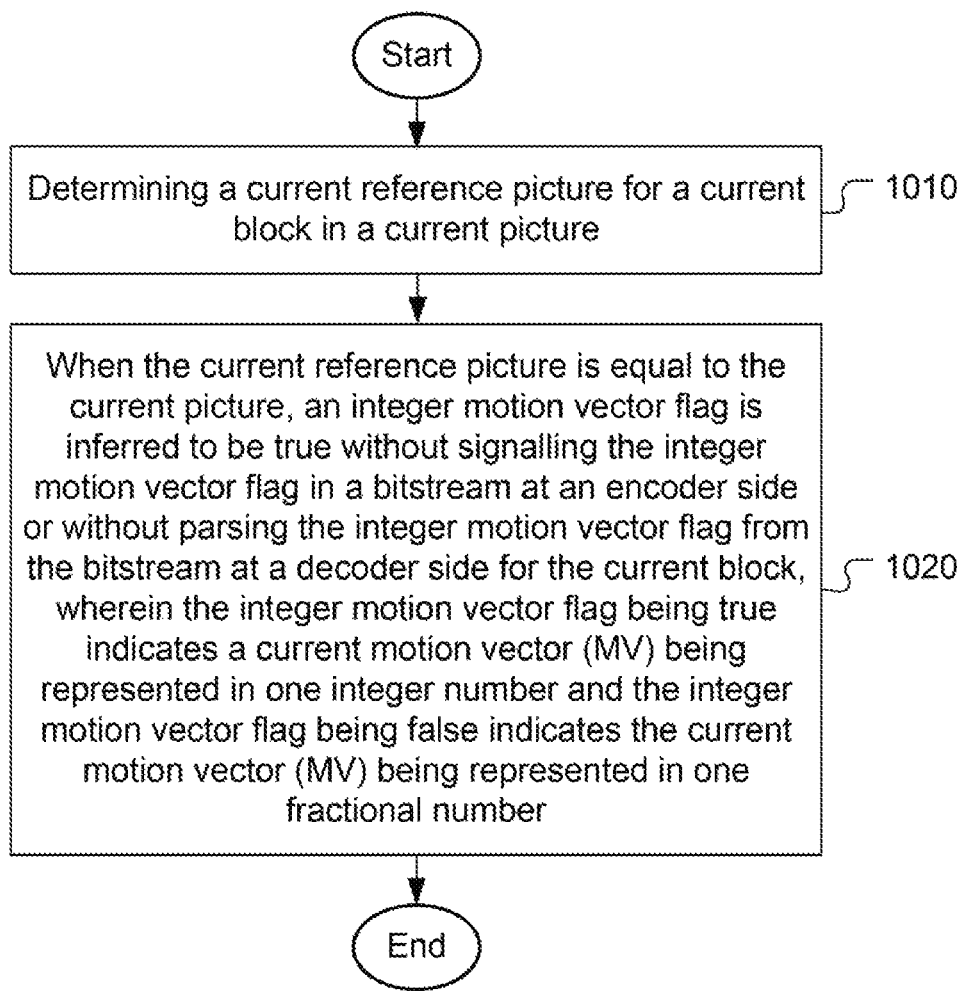
FIG. 10 illustrates a flowchart of an exemplary coding system with the current picture referencing (CPR) and adaptive motion vector resolution (AMVR) coding tools enabled according to an embodiment of the present invention.

FIG. 10 illustrates a flowchart of an exemplary coding system with the current picture referencing (CPR) and adaptive motion vector resolution (AMVR) coding tools enabled according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a current reference picture for a current block in a current picture is determined in step 1010. In step 1020, when the current reference picture is equal to the current picture, an integer motion vector flag is inferred to be true without signalling the integer motion vector flag in a bitstream at an encoder side or without parsing the integer motion vector flag from the bitstream at a decoder side for the current block, where the integer motion vector flag being true indicates a current motion vector (MV) being represented in one integer number and the integer motion vector flag being false indicates the current motion vector (MV) being represented in one fractional number.

Figure 11:
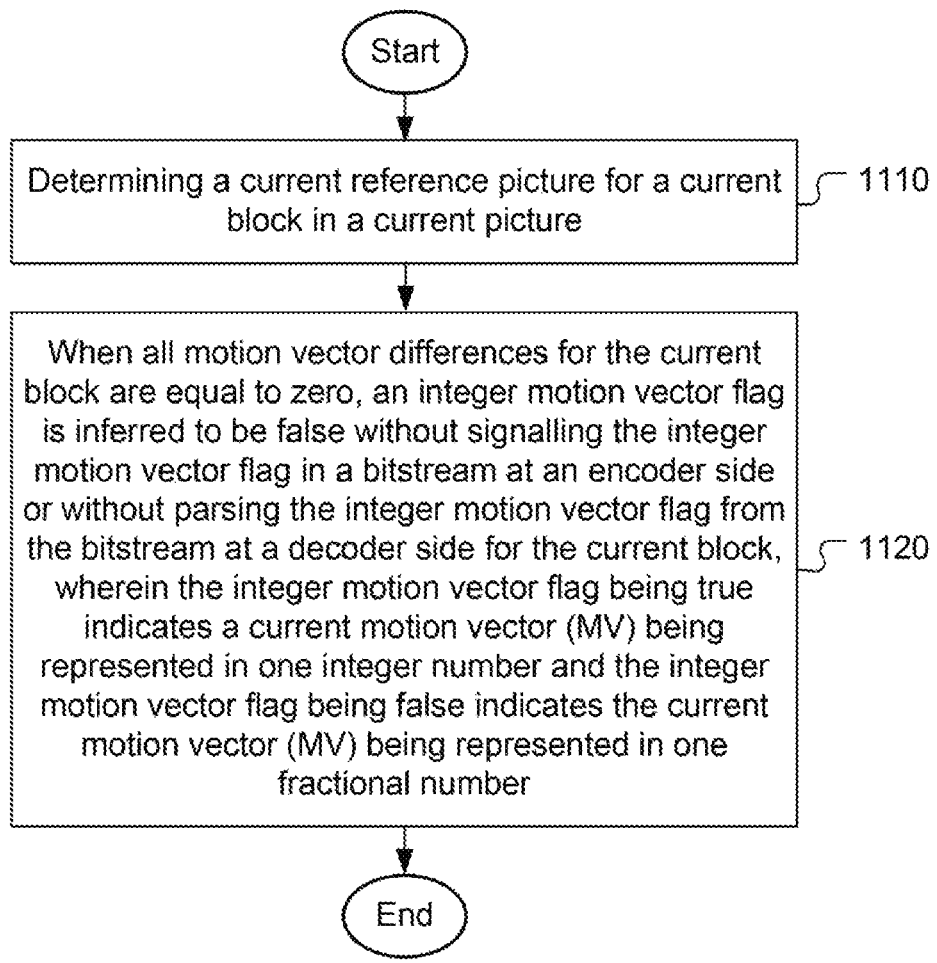
FIG. 11 illustrates a flowchart of an exemplary coding system with the current picture referencing (CPR) and adaptive motion vector resolution (AMVR) coding tools enabled according to another embodiment of the present invention.

FIG. 11 illustrates a flowchart of an exemplary coding system with the current picture referencing (CPR) and adaptive motion vector resolution (AMVR) coding tools enabled according to another embodiment of the present invention. According to this method, a current reference picture for a current block in a current picture is determined in step 1110. In step 1120, when all motion vector differences for the current block are equal to zero, an integer motion vector flag in inferred to be false without signalling the integer motion vector flag in a bitstream at an encoder side or without parsing the integer motion vector flag from the bitstream at a decoder side for the current block, where the integer motion vector flag being true indicates a current motion vector (MV) being represented in one integer number and the integer motion vector flag being false indicates the current motion vector (MV) being represented in one fractional number.

Figure 12:
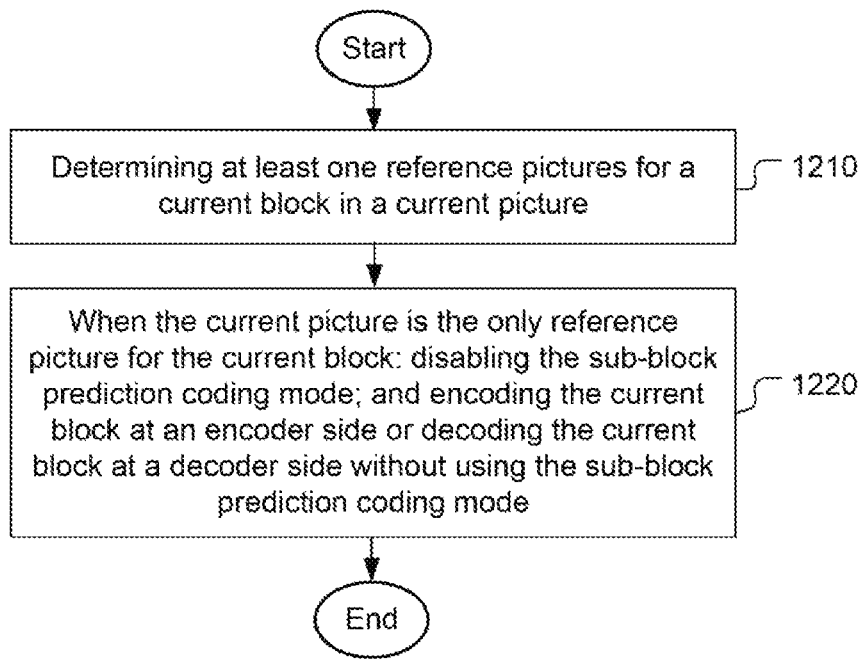
FIG. 12 illustrates a flowchart of an exemplary coding system with the current picture referencing (CPR) coding tool and sub-block prediction coding mode enabled according to yet another embodiment of the present invention.

FIG. 12 illustrates a flowchart of an exemplary coding system with the current picture referencing (CPR) coding tool and sub-block prediction coding mode enabled according to yet another embodiment of the present invention. According to this method, at least one reference picture for a current block in a current picture is determined in step 1210. In step 1220, when the current picture is the only reference picture for the current block: the sub-block prediction coding mode is disabled; and the current block is encoded at an encoder side or decoded at a decoder side by disabling the sub-block prediction coding mode.

Figure 13:
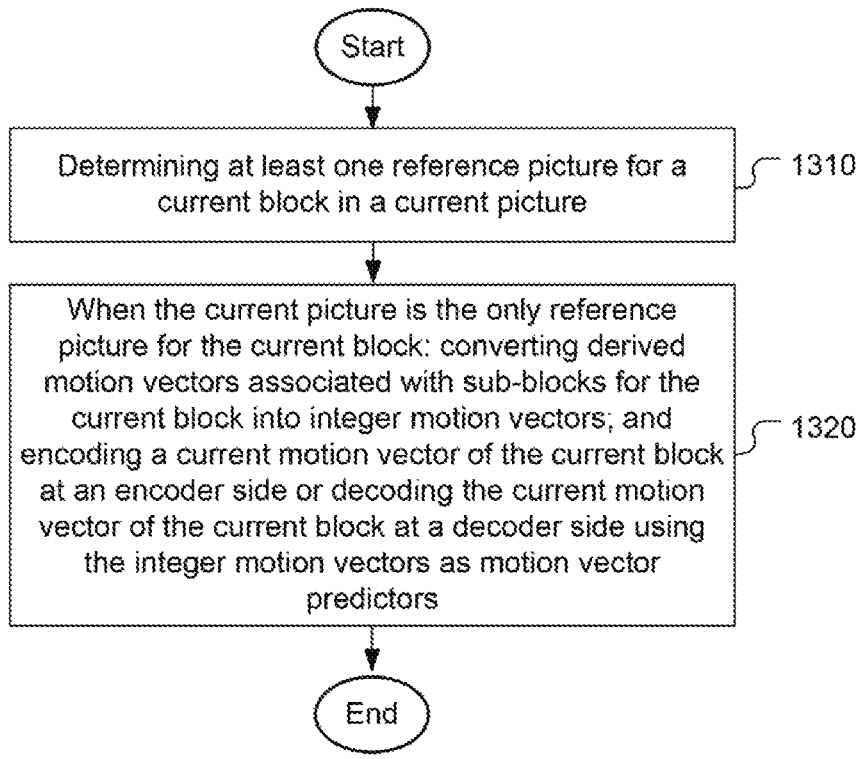
FIG. 13 illustrates a flowchart of an exemplary coding system with the current picture referencing (CPR) coding tool and sub-block prediction coding mode enabled according to yet another embodiment of the present invention.

FIG. 13 illustrates a flowchart of an exemplary coding system with the current picture referencing (CPR) coding tool and sub-block prediction coding mode enabled according to yet another embodiment of the present invention. According to this method, at least one reference picture for a current block in a current picture are determined in step 1310. In step 1320, when the current picture is the only reference picture for the current block: derived motion vectors associated with sub-blocks for the current block are converted into integer motion vectors; and a current motion vector of the current block is encoded at an encoder side or decoded at a decoder side using the integer motion vectors as motion vector predictors.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of syntax processing for a video encoding system and video decoding system, wherein current picture referencing (CPR) and adaptive motion vector resolution (AMVR) coding tools are enabled, the method comprising:
   determining a current reference picture for a current block in a current picture; and
   when the current reference picture is equal to the current picture, inferring an integer motion vector flag to be true without signalling the integer motion vector flag in a bitstream at an encoder side or without parsing the integer motion vector flag from the bitstream at a decoder side for the current block, wherein the integer motion vector flag being true indicates a current motion vector (MV) being represented in one integer number and the integer motion vector flag being false indicates the current motion vector (MV) being represented in one fractional number.

2. The method of claim 1, further comprising when the integer motion vector flag is true, signalling an additional indication in the bitstream at the encoder side or parsing the additional indication from the bitstream at the decoder side for the current block, and wherein the additional indication indicates whether an integer mode or a 4-pel mode is used.

3. The method of claim 1, wherein the integer motion vector flag is referred to be true regardless of a motion vector difference (MVD) between the current MV and an MV predictor.

4. The method of claim 1, further comprising when the current reference picture is not equal to the current picture and all motion vector differences for the current block are equal to zero, inferring the integer motion vector flag to be false without signalling the integer motion vector flag in the bitstream at the encoder side or without parsing the integer motion vector flag from the bitstream at the decoder side for the current block.

5. The method of claim 1, wherein and the integer motion vector flag being false indicates the current motion vector (MV) being represented in one fractional number.

6. An apparatus of syntax processing for a video encoding system and video decoding system, wherein current picture referencing (CPR) and adaptive motion vector resolution (AMVR) coding tools are enabled, the apparatus comprising: one or more electronic circuits or processors arrange to:
   determine a current reference picture for a current block in a current picture; and
   when the current reference picture is equal to the current picture, infer an integer motion vector flag to be true without signalling the integer motion vector flag in a bitstream at an encoder side or without parsing the integer motion vector flag from the bitstream at a decoder side for the current block, wherein the integer motion vector flag being true indicates a current motion vector (MV) being represented in one integer number and the integer motion vector flag being false indicates the current motion vector (MV) being represented in one fractional number.

7. A method of syntax processing by a video encoding system and video decoding system, wherein current picture referencing (CPR) and adaptive motion vector resolution (AMVR) coding tools are enabled, the method comprising:

determining motion vector differences for a current block in a current picture; and when all motion vector differences for the current block are equal to zero, inferring an integer motion vector flag to be false without signalling the integer motion vector flag in a bitstream at an encoder side or without parsing the integer motion vector flag from the bitstream at a decoder side for the current block, wherein the integer motion vector flag being true indicates a current motion vector (MV) being represented in one integer number and the integer motion vector flag being false indicates the current motion vector (MV) being represented in one fractional number.

8. The method of claim 7, wherein the integer motion vector flag is referred to be false when all motion vector differences for the current block are equal to zero regardless of whether a selected reference picture associated with the current MV is equal to the current picture or not.

9. The method of claim 8, wherein the integer motion vector flag is referred to be true if any motion vector difference for the current block is not equal to zero and the selected reference picture associated with the current MV is equal to the current picture.

10. The method of claim 8, wherein the integer motion vector flag is signalled in the bitstream at the encoder side or parsed from the bitstream at the decoder side for the current block if any motion vector difference for the current block is not equal to zero and the selected reference picture associated with the current MV is not equal to the current picture.

11. The method of claim 7, wherein the integer motion vector flag is referred to be false only when a selected reference picture associated with the current MV is not equal to the current picture.

12. An apparatus of syntax processing for a video encoding system and video decoding system, wherein current picture referencing (CPR) and adaptive motion vector resolution (AMVR) coding tools are enabled, the apparatus comprising one or more electronic circuits or processors arrange to:

determine motion vector differences for a current block in a current picture; and when all motion vector differences for the current block are equal to zero, infer an integer motion vector flag to be false without signalling the integer motion vector flag in a bitstream at an encoder side or without parsing the integer motion vector flag from the bitstream at a decoder side for the current block, wherein the integer motion vector flag being true indicates a current motion vector (MV) being represented in one integer number and the integer motion vector flag being false indicates the current motion vector (MV) being represented in one fractional number.

\* \* \* \* \*